United States Patent [19]
Kato et al.

[11] Patent Number: 4,585,697
[45] Date of Patent: Apr. 29, 1986

[54] MAGNETIC RECORDING MEDIUM

[75] Inventors: Hirohisa Kato, Ebina; Toshihiko Oguchi, Atsugi; Yuji Doki, Tokyo, all of Japan

[73] Assignee: Kabushiki Kaisha Toshiba, Kawasaki, Japan

[21] Appl. No.: 654,465

[22] Filed: Sep. 26, 1984

[30] Foreign Application Priority Data

Sep. 28, 1983 [JP] Japan .................................. 58-177874

[51] Int. Cl.$^4$ ................................................ G11B 5/70
[52] U.S. Cl. ............................ 428/403; 252/62.54; 427/128; 360/134; 360/135; 360/136; 428/405; 428/407; 428/522; 428/694; 428/900
[58] Field of Search ............... 428/694, 405, 403, 407, 428/900, 522, 328, 329, 330; 427/128; 252/62.54; 360/134–136

[56] References Cited

U.S. PATENT DOCUMENTS

| 3,139,354 | 6/1964 | Wolff | 428/900 |
| 3,833,412 | 9/1974 | Akashi | 428/900 |
| 3,901,844 | 8/1975 | Schiller | 260/37 PC |
| 4,268,430 | 5/1981 | Suzuki | 260/37 R |
| 4,330,600 | 5/1982 | Kawasumi | 428/900 |
| 4,379,809 | 4/1983 | Matsufuji | 428/694 |
| 4,404,259 | 9/1913 | Hosaka | 428/900 |
| 4,442,159 | 4/1984 | Dezawa | 428/328 |
| 4,486,496 | 12/1984 | Dezawa | 428/694 |
| 4,521,486 | 6/1985 | Ninomiya | 428/407 |

FOREIGN PATENT DOCUMENTS

| 83104394.8 | 5/1983 | European Pat. Off. . |
| 2017200 | 10/1971 | Fed. Rep. of Germany . |
| 2543962 | 4/1977 | Fed. Rep. of Germany . |
| 86103 | 6/1980 | Japan . |
| 1121367 | 7/1968 | United Kingdom . |
| 1193015 | 5/1970 | United Kingdom . |
| 1307399 | 2/1973 | United Kingdom . |

OTHER PUBLICATIONS

O. Kubo, "Properties of Ba Ferrite Particles for Perpendicular Magnetic Recording", IEEE MAG-8, 1122 (1982).
Ucar Solution Vinyl Resins for Coatings—Union Carbide pp. 1–38.
Foreign Search Report.

Primary Examiner—Ellis P. Robinson
Attorney, Agent, or Firm—Schwartz, Jeffery, Schwaab, Mack, Blumenthal & Evans

[57] ABSTRACT

A magnetic recording medium is disclosed comprising a substrate coated with a mixture which consists essentially of (1) hexagonal plate-like shaped, ferrite magnetic powder particles having an average particle diameter of 0.2 $\mu$m or less and (2) a binder resin having an active hydrogen equivalent of 2000 or more. This magnetic recording medium displays no flocculation of the hexagonal system ferrite magnetic powder, and has excellent dispersion properties and perpendicular orientation ability. Further, smoothness on the coating film is good, and S/N properties are noticeably improved.

10 Claims, No Drawings

MAGNETIC RECORDING MEDIUM

BACKGROUND OF THE INVENTION

This invention relates to a perpendicular magnetization type magnetic recording medium, more specifically to a magnetic recording medium including a magnetic powder excellent in a perpendicular orientation ability and having remarkable improved S/N properties.

The magnetic recording medium can be manufactured by, for example, coating, in the form of a layer, a support such as a polyester film with a magnetic coating composition comprising the magnetic powder and a binder resin or comprising these components and a variety of additives, if desired; carrying out a magnetical orientation treatment for the magnetic powder; and curing the coating layer of the resin (see Japanese Patent Publication No. 10773/1983 entitled "Method for preparing magnetic recording medium").

In this case, as the magnetic powder, a needle magnetic powder has heretofore been used. In order to heighten a recording density of the magnetic recording medium, it is inevitably necessary to lessen a particle diameter of the magnetic powder particle used. However, in the case of the presently used needle magnetic powder where a shape anisotropy is utilized, it is very difficult to minimize the particle diameter of the powder particles.

Moreover, a further development in the magnetic recording is directed toward a high-quality image recording, and such development is considered to be conveniently accomplished by replacing a conventional analog recording system with a digital recording system.

The magnetic powder used in the recording medium for this digital recording system must be capable of a perpendicular magnetic recording and must be smaller in particle diameter than the conventional needle magnetic powder. Therefore, hexagonal system ferrite magnetic powders, above all, barium ferrite magnetic powders are advantageous.

With regard to the hexagonal system ferrite magnetic powder, its crystal has such a shape as a hexagonal plate and possesses a magnetic easy axis in a direction perpendicular to the plate surface.

When such a magnetic powder is employed to manufacture the recording medium, its recording density will be greatly affected by a distributive condition of the magnetic powder in the aforesaid coating layer.

Thus, when an average particle diameter of the used hexagonal ferrite magnetic powder is lessened for the purpose of heightening the recording density, it will be more difficult to disperse the magnetic powder in the state of separate particles in the binder resin because of flocculation of the magnetic powder, and it will be impossible to obtain the high-density recording which can be supposed from the particle diameter of the powder.

Further, when the magnetic coating composition is applied to the surface of the support and the magnetic easy axes are oriented in a perpendicular direction to the support, a sufficient perpendicular orientation ability cannot be obtained, if the magnetic powder has a small particle diameter. As a result, such S/N properties as are expected cannot be obtained.

This phenomenon would be considered to be due to the fact that the dispersion of the hexagonal system ferrite magnetic powder is poor or the respective magnetic powder particles are freely rotated by an interaction of these particles and the binder resin in the coating layer during the perpendicular orientation treatment in order to prevent the magnetic powder from taking a desired distribution.

Heretofore, as the binder resins, there have been often used resins plentifully including groups containing active hydrogen atoms such as a hydroxyl group, a carboxyl group, an urethane bond, an urea bond and the like (for example, see Japanese Patent Provisional Publications No. 205828/1982, No. 113420/1982 and No. 27429/1982). However, in the case that by using such a resin together with the hexagonal system ferrite magnetic powder, the magnetic coating composition is prepared, the smaller the particle diameter of the magnetic powder, the easier the gelation of the coating composition, and when allowed to stand, such a coating composition will tend to bring about the flocculation. Accordingly, in order to obtain a coating film having a smooth surface by the use of such a coating composition, it will be essential to make use of a high shearing force at a coating operation.

When the coating film which has been formed by employing the coating composition in the state of such a dispersion is placed in an orientation magnetic field, the flocculation of the magnetic powder will occur owing to the action of the magnetic field, with the result that a rough surface will be formed on the coating film. This rough surface will increase fluctuation of a recording reproduction output and will lead to noise greater than an output-improving effect based on the magnetic orientation, whereby the S/N will deteriorate.

This phenomenon would be supposed to be due to the fact that groups including active hydrogen in the resin are securely adsorbed on or bound to the surfaces of the hexagonal system ferrite magnetic powder particles, so that the distribution state of the magnetic powder in the coating composition is stably retained for a long period of time, but a kind of network structure is also formed in the coating composition as a consequence a free rotary motion or a translational motion of the respective magnetic powder particles is disturbed and masses resulting from the flocculation of the magnetic powder carry out a rotary or a translational motion, so that smoothness on the surface of the coating film is worsened.

SUMMARY OF THE INVENTION

An object of this invention is to provide a perpendicular magnetic recording medium excellent in a perpendicular orientation ability and S/N properties, and according to the perpendicular magnetic recording medium of this invention, there are overcome problems regarding the magnetic recording medium comprising a fine hexagonal system ferrite magnetic powder and a binder resin, i.e. flocculation of the magnetic powder is inhibited, so that the respective powder particles can be perfectly dispersed, and a smooth coating film surface is thus obtained.

The magnetic recording medium of this invention comprises a substrate coated thereon with a mixture which is substantially composed of a hexagonal system ferrite magnetic powder of 0.2 $\mu$m or less in average particle diameter and a binder resin of about 2,000 or more in active hydrogen equivalent.

DESCRIPTION OF THE PREFERRED EMBODIMENTS

Examples of the hexagonal system ferrites used in this invention include barium ferrite, strontium ferrite, calcium ferrite, lead ferrite and substituted barium ferrites represented by the formula:

$$BaO \cdot n(Fe_{1-m}M_m)_2O_3$$

wherein M is at least one element selected from the group consisting of Co, Ti, Zn, Ni, Mn, In, Cu, Ge and Nb; m is any number of 0 to 0.2; and n is any number of 5.4 to 6.0. Particularly, barium ferrite is preferable because of a great magnetic coercive force.

An average particle diameter of the ferrite magnetic powder is a factor to decide a recording density, and the smaller the particle diameter is, the better, as mentioned above. The powder used in this invention has an average particle diameter of 0.2 $\mu$m or less, preferable 0.1 $\mu$m or less. When the average particle diameter is more than 0.2 $\mu$m, a high-density recording will be disadvantageously difficult to obtain. The average particle diameter referred to here means a length of a diagonal in the hexagonal plate-like configuration of each powder particle.

Such a magnetic powder can be prepared as follows:

First, an aqueous solution in which necessary metallic elements are contained in predetermined ion concentrations and a pH of which has been adjusted to a predetermined level is held in an autoclave at a temperature of 150° to 250° C. for a period of 20 minutes to 2 hours in order to accomplish a hydrothermal synthetic reaction and to thereby co-precipitate the respective elements which constitute a hexagonal system ferrite precursor having a predetermined composition. This precursor is the same as a desired crystalline magnetic powder in composition and particle diameter, but its crystal is quite incomplete and its magnetic properties such as magnetic coercive force and saturated magnetization are very insuffcient.

Then, after water washing and drying of the precursor, calcination is carried out, for example, at a temperature of 800 C or more for about 1 hour. In this calcination process, the calcined product (powder or particles) is preferably stirred to float it on the aqueous solution. For this purpose, a rotary kiln may be utilized and a fluidized bed calcination may be applied. In this process, the precursor is changed into a crystal having a complete hexagonal plate configuration, i.e. a hexagonal system ferrite magnetic powder having a narrow particle diameter distribution. Its particle diameter can be adjusted to 0.2 $\mu$m or less by varying a pH value, a temperature at the time of the preparation of the precursor and a calcination temperature.

A binder resin used in this invention has an active hydrogen equivalent of 2,000 or more. The resin having the active hydrogen equivalent of less than 2,000 is not effective to inhibit the flocculation of the magnetic powder and thus cannot improve S/N properties. The preferred active hydrogen equivalent is within the range of about 3,000 to about 20,000 or so.

In this invention, any binder resin may be employed so long as the active hydrogen equivalent of the composite resins is 2,000 or more, but preferably a binder resin having the active hydrogen equivalent of not more that 1,000 is excluded. If the binder resin having the active hydrogen equivalent of not more than 1,000 is contained, the magnetic powder particles became hard to freely rotate by the hydrogen bonding so that the orientation of the magnetic powder would be inhibited.

The active hydrogen equivalent referred to here can be calculated, for example, by quantitatively determining a molar quantity of the active hydrogen of the aimed binder resin in accordance with the undermentioned quantitative determination process and dividing a weight of the aimed binder resin by a molar quantity. This molar quantity is a total amount of hydrogen atoms present in hydroxyl groups, carboxyl groups, urethane bonds or urea bonds.

The quantitative determination of the hydroxyl groups may be carried out by acetylating the aimed binder resin with acetic anhydride in the presence of a catalyst such as sulfuric acid, perchloric acid or p-toluenesulfonic acid and titrating excess acetic acid with an alkali, alternatively by thermally esterifying the binder resin with glacial acetic acid in the presence of boron trifluoride as a catalyst and measuring free water content in a titration manner in accordance with Karl Fischer's test. Further, the quantitative determination of the carboxyl groups may be carried out by titrating the aimed binder resin with a 1/10N alcoholic potassium hydroxide solution by the use of a mixed indicator of Bromothymol Blue and Phenol Red. Furthermore, the quantitative determination of the urethane bonds and the urea bonds may be carried out as follows: First, the aimed binder resin is dipped into a 8% caustic soda solution and is then subjected to a thermal treatment in a stainless steel sealed vessel at a temperature of 155° C. for 24 hours, and ether extraction is afterward carried out while an alkali condition is maintained. Hydrochloric acid is then added to the extracted ether to further carry out extraction, so that diamine hydrochloride passes to a water phase. Afterward, the diamine hydrochloride is quantitatively determined.

When a molecular weight of the used resin is too small, there will occur a problem such as the deterioration of bonding strength; when it is inversely too large, the resin will not be dissolved in a solvent which is used in preparing the magnetic coating composition. Therefore, it is preferred that the molecular weight of the resin is within the range of about 5,000 to about 30,000.

As the binder resin used in this invention, any one may be used so long as it satisfies the above-mentioned requirements of properties and has the binding ability to the magnetic powder, but preferable examples include polyester resins and polycarbonate resins.

Examples of the polyester resins include Vylon-200, Vylon-280, Vylon-300 and Vylon-530 (all trade names; Toyobo Co., Ltd., each active hydrogen equivalent: 5,000 to 8,000; each molecular weight: 15,000 to 20,000), and examples of the aforesaid polycarbonate resins include Lexan 2014 and Lexan 500 (all trade names; GE Inc., each active hydrogen equivalent: 6,000 to 10,000; molecular weight: 20,000 to 30,000). When used, the resin may be hydrolyzed in order to lower its molecular weight to the above-mentioned range.

These binder resins may be employed alone or in the form of a suitably mixed resin of them. Further, if desired, there may be suitable added thereto a vinyl chloride-vinyl acetate copolymer having an active hydrogen equivalent of 1,000 or more, a vinyl alcohol-modified vinyl chloride-vinyl acetate copolymer, a carboxylic acid-modified vinyl chloride-vinyl acetate copolymer and a polyurethane elastomer.

In this invention, the aforesaid magnetic powder may be directly dispersed into the binder resin at the time of the preparation of the magnetic coating composition, but the magnetic powder which has previously been coated with a surface active agent shown hereinafter may be employed in order to acquire a better dispersion condition and perpendicular orientation ability.

Examples of the surface active agents include compounds represented by the following formulae (I) to (V):

$$R^1-O-\underset{\underset{O-R^2}{|}}{\overset{\overset{O}{\|}}{P}}-O-M \qquad (I)$$

wherein M is a hydrogen atom, an alkali metal or an alkaline earth metal; $R^1$ is $$R^3+OCH_2CH_2\overset{}{)_n}+O-\overset{\overset{CH_3}{|}}{CH}-CH_2\overset{}{)_m}-$$

(wherein $R^3$ is an alkyl group having 4 to 20 carbon atoms or an aryl group substituted by an alkyl group having 4 to 20 carbon atoms, and n and m are integers satisfying the relation of $0 \leq n \leq 14$, $0 \leq m \leq 20$ and $0 \leq n + m 20$ ; and $R^2$ is the above-mentioned $R^1$ or M;

$$R^3-COOM \qquad (II)$$

wherein $R^3$ is an alkyl group having 4 to 20 carbon atoms or an aryl group substituted by an alkyl group having 4 to 20 carbon atoms; and M is as defined above;

$$R^3-\underset{\underset{R^4}{|}}{Si}+OR^5)_2 \qquad (III)$$

wherein $R^3$ is as defined above; R is the aforesaid $R^2$, a methoxy group or an ethoxy group; and $R^5$ is a methyl group or an ethyl group;

$$R^6-O-\underset{\underset{O-R^7}{|}}{Ti}+O-R^5)_2 \qquad (IV)$$

wherein $R^5$ is as defined above; $R^6$ is an alkyl group having 7 to 20 carbon atoms; and $R^7$ is the aforesaid $R^5$ or $R^6$; and

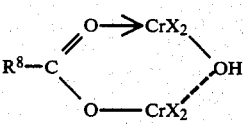

$$(V)$$

wherein $R^8$ is an alkyl group having 4 to 20 carbon atoms and X is an anion. The above surface active agents may be used alone or in the form of a mixture of two or more kinds thereof.

Surface treatment may be accomplished by throwing the magnetic powder into a solution in which the aforesaid surface active agent is dissolved in a solvent such as methyl ethyl ketone or toluene in a suitable concentration, in order to coat the magnetic powder with the surface active agent.

The magnetic recording medium of this invention may be prepared as follows: First of all, the magnetic powder or the surface treated magnetic powder, a solvent and a dispersion medium are mixed in a dispersing mixer such as a sand grinder pot for a predetermined period of time. Next, the above-mentioned binder resin and additives such as a lubricant, an abrasive and a carbon black are added thereto, and mixing is further carried out in order to form a magnetic coating composition.

The formed coating composition is then filtered to remove glass beads (the dispersion medium), and an isocyanate curing agent is blended therewith, if desired. The resulting composition is then applied to the surface of a substrate such as a polyester film. Afterward, the applied substrate is introduced into a magnetic field arranged vertically to its surface and is dried under hot air therein. The dried coating film is finally subjected to usual processings and a smoothing treatment in order to prepare the magnetic recording medium of this invention.

Examples of the lubricants used in this invention include fatty acids such as oleic acid, elaidic acid, lauric acid, myristic acid, palmitic acid and stearic acid; fatty acid esters such as butyl oleate, butyl myristate, butoxybutyl strearate and butyl stearate; and fatty acid amides such as stearic acid amide, oleic acid amide and ethylenebisstearic acid amide. Besides them, silicone oil, wax and the like may also be used. Examples of the abrasives include $Al_2O_3$, $Cr_2O_3$, $TiO_2$, $ZrO_2$, $ZrSiO_4$, $SiO_2$ and $\alpha\text{-}Fe_2O_3$, and it is preferred that these compounds have Mohs+ hardness of 6 or more and a particle diameter of 1 μm or less.

Examples of the carbon blacks include Vulcan XC-72R (trade name; available from Gabot Corp.) and Ketjen Black E.C. (trade name; available from Lion Akzo Co., Ltd.).

Examples of the isocyanate curing agents include Colonate L, Colonate EH and Colonate HL (all trade names; available from Nippon Polyurethane Inc.)

This invention will be described in detail in reference to examples as follows:

EXAMPLE 1

To 200 g of a solvent including equal weights of methyl ethyl ketone and toluene were added 100 g of a barium ferrite magnetic powder having an average particle diameter of 0.08 μm, and a dispersion treatment was carried out by a ball mill. Further, to the mixture were added 60 g of Vylon-200 (30 wt % solution) having an active hydrogen equivalent of about 10,000 and a molecular weight of 15,000 to 20,000, 2 g of carbon black (Vulcan XC-72R), 2 g of a lubricant (a mixture including stearic acid and butyl stearate in a ratio of 1:1) and 3 g of $Cr_2O_3$ as an abrasive (Green 5; trade name, available from Nippon Kagaku Kogyo Co., Ltd.) having a particle diameter of 0.5 to 1.0 μm, and a sand grinding mill dispersion was then carried out.

With regard to the thus obtained magnetic coating composition, any flocculation did not occur, and even when it was allowed to stand at ordinary temperature for 3 days, no change was observed.

By the use of this magnetic coating composition, perpendicular orientation tapes and non-orientation tapes were prepared in a usual manner, and properties of both the tapes were measured. The results are shown in Table 1.

TABLE 1

|  | Perpendicular orientation percent (%) | Gloss (%) | Surface roughness (μm) | S/N (dB): λ = 0.6 μm |
|---|---|---|---|---|
| Non-orientation tape | — | 180 | <0.03 | +35.5 |
| Perpendicular orientation tape | 82 | 165 | <0.04 | +37.1 |

Incidentally, also when Vylon-200 was replaced with Lexan 2014, similar results were obtained.

COMPARATIVE EXAMPLE 1

The same procedure as in Example 1 was repeated with the exception that a polyurethane elastomer having an active hydrogen equivalent of 540 and a molecular weight of 60,000 was used in place of Vylon-200 in order to prepare a magnetic coating composition. With regard to the obtained coating composition, when it was allowed to stand for 2 hours, the used solvent was separated out and some flocculation occurred.

By the use of this magnetic coating composition, perpendicular orientation tapes and non-orientation tapes were prepared, and properties of both the tapes were measured. The results are shown in Table 2.

TABLE 2

|  | Perpendicular orientation percent (%) | Gloss (%) | Surface roughness (μm) | S/N (dB): λ = 0.6 μm |
|---|---|---|---|---|
| Non-orientation tape | — | 145 | 0.05 | +33.1 |
| Perpendicular orientation tape | 63 | 125 | 0.06 | +33.5 |

Incidentally, in both the cases, noise peaks were observed at λ=7 μm which would be attributable to formed flocculates.

EXAMPLE 2

One hundred grams of a barium ferrite magnetic powder having an average particle diameter of 0.08 μm were dispersed in a solution comprising 3.5 g of dioctyl phosphate, 100 g of methyl ethyl ketone and 100 g of toluene by means of a ball mill in order to accomplish a surface treatment.

The thus treated magnetic powder was added to a mixed solution of water and toluene and enough stirring was then carried out, followed by standing still. At this time, all of the magnetic powder passed to a toluene phase, which indicates that the magnetic powder was coated with the dioctyl phosphate.

Afterward, this magnetic powder was thrown into a solution having the following composition, and the ball mill dispersion was carried out again to prepare a magnetic coating composition.

| | |
|---|---|
| Vylon-200 (30 wt % solution) having an active hydrogen equivalent of about 10,000 and a molecular weight of 15,000 to 30,000 | 40 g |
| Vylon-300 (30 wt % solution) having an active hydrogen equivalent of about 10,000 and a molecular weight of 20,000 to 25,000 | 20 g |
| Methyl ethyl ketone | 70 g |
| Toluene | 80 g |
| Cyclohexane | 50 g |
| Carbon black (the same as in Example 1) | 2 g |
| Lubricant (the same as in Example 1) | 1.5 g |
| Abrasive ($Cr_2O_3$; particle diameter 0.5 to 1.0 μm) | 3 g |

With regard to the thus obtained magnetic coating composition, no flocculation was observed, and even when it was allowed to stand at ordinary temperature for 3 days, no change occurred.

By the use of this coating composition, perpendicular orientation tapes and non-orientation tapes were prepared, and properties of both the tapes were measured. The results are shown in Table 3.

TABLE 3

|  | Perpendicular orientation percent (%) | Gloss (%) | Surface roughness (μm) | S/N (dB): λ = 0.6 μm |
|---|---|---|---|---|
| Non-orientation tape | — | 205 | <0.03 | +36.0 |
| Perpendicular orientation tape | 85 | 196 | <0.03 | +38.5 |

When Vylon-200 and Vylon-300 were replaced with Lexan 500, similar results were obtained.

COMPARATIVE EXAMPLE 2

A magnetic coating composition having the following ingredients was prepared by a sand grinding mill dispersion.

| | |
|---|---|
| Barium ferrite magnetic powder having a particle diameter of 0.08 μm | 100 g |
| Dioctyl phosphate | 3.5 g |
| Polyurethane having an active hydrogen equivalent of 840 and a molecular weight of about 30,000 (30 wt % solution) | 35 g |
| Vinyl chloride-vinyl acetate copolymer having an active hydrogen equivalent of 700 and a molecular weight of about 7,000 (30 wt % solution) | 25 g |
| Carbon black (the same as in Example 1) | 2 g |
| Lubricant (the same as in Example 1) | 2 g |
| Abrasive ($Cr_2O_3$; average particle diameter 0.5 μm) | 4 g |

With regard to this coating composition, some flocculation occurred.

By the use of this coating composition, perpendicular orientation tapes and non-orientation tapes were prepared, and properties of both the tapes were measured. The results are shown in Table 4.

TABLE 4

|  | Perpendicular orientation percent (%) | Gloss (%) | Surface roughness (μm) | S/N (dB): λ = 0.6 μm |
|---|---|---|---|---|
| Non-orientation tape | — | 150 | 0.05 | +33.5 |
| Perpendicular orientation tape | 70 | 137 | 0.06 | +34.1 |

Incidentally, noise peaks were observed nearly at λ=6.5 μm which would be attributable to formed flocculates.

EXAMPLES 3 to 7

To 200 g of a mixed solvent including equal weights of methyl ethyl ketone, toluene and cyclohexanone were added 100 g of a barium ferrite magnetic powder having an average particle diameter of 0.08 μm, and by the use of a variety of surface active agents shown in Table 5, magnetic coating compositions were prepared in the same manner as in Example 2, perpendicular orientation tapes were prepared employing these magnetic coating compositions and were measured for their properties. The results are shown in Table 5.

TABLE 6-continued

|  |  | Example | | | Comparative Example | |
|---|---|---|---|---|---|---|
|  |  | 8 | 9 | 10 | 6 | 7 |
| Pro-per-ties | Cyclohexane | 75 | 65 | 50 | 50 | 50 |
|  | Perpendicular orientation percent (%) | 83 | 85 | 86 | 72 | 67 |

TABLE 5

| | Surface active agent | Amount (g) | Perpendicular orientation percent (%) | Gloss (%) | Surface roughness (μm) | S/N ratio (dB) | Flocculation of coating composition |
|---|---|---|---|---|---|---|---|
| | Kind | | | | | | |
| Example 3 | $C_4H_7(OCH_2CH_2)_4O-\overset{O}{\underset{\|}{P}}-OH$ <br> $C_4H_7(OCH_2CH_2)_4-O$ | 3.7 | 84 | 200 | 0.03 | +38.6 | Not occured |
| Example 4 | $C_{12}H_{25}-C\overset{O\rightarrow Cr^{2+}}{\underset{O-Cr^{2+}}{\diagdown}}\overset{\diagup OH}{} \quad 4Cl^-$ | 4.5 | 83 | 187 | 0.04 | +36.7 | Not occured |
| Example 5 | $C_{18}H_{37}COOH$ | 3.5 | 83 | 179 | 0.04 | +36.4 | Not occured |
| Example 6 | $C_9H_{19}(OCH_2CH_2)_5O-\overset{O}{\underset{\|}{P}}-OH$ <br> $OH$ | 4.0 | 87 | 209 | <0.03 | +38.9 | Not occured |
| Example 7 | $C_{18}H_{37}O-Ti\overset{OCH_3}{\underset{OCH_3}{-OCH_3}}$ | 3.9 | 84 | 188 | 0.04 | +36.8 | Not occured |
| Comparative Example 3 | $C_3H_7COOH$ | 3.6 | 69 | 124 | 0.06 | +33.7 | Occured in one hour |
| Comparative Example 4 | $C_2H_5-C\overset{O\rightarrow Cr^{2+}}{\underset{O-Cr^{2+}}{\diagdown}}\overset{\diagup OH}{} \quad 4Cl^-$ | 3.4 | 66 | 130 | 0.07 | +33.4 | Occured in one hour |
| Comparative Example 5 | $Ti(OC_2H_5)_4$ | 2.8 | 63 | 118 | 0.07 | +33.2 | Occured in one hour |

EXAMPLES 8 to 10

By the use of 100 g of the surface treated magnetic powder which had been made in Example 6, magnetic coating compositions were prepared in accordance with component proportions shown in Table 6, and perpendicular orientation tapes were manufactured.

For each tape, perpendicular orientation percent and S/N ratio were measured, and the results are shown in Table 6.

TABLE 6

| | | Example | | | Comparative Example | |
|---|---|---|---|---|---|---|
| | | 8 | 9 | 10 | 6 | 7 |
| Binder resin (g) | Polyester *1 | 5 | 8 | 10 | 5 | 7 |
| | Vinyl chloride-vinyl acetate copolymer *2 | 7 | 4 | 2 | 4 | — |
| | Polyurethane *3 | — | — | — | 3 | 5 |
| Additive (g) | Carbon black | 3 | 2.5 | 4 | 3.5 | 4 |
| | Abrasive | 4 | 3 | 4 | 4 | 4 |
| | Lubricant | 2 | 2.5 | 3 | 3 | 3 |
| | Methyl ethyl ketone | 100 | 100 | 100 | 125 | 125 |
| | Toluene | 50 | 60 | 75 | 50 | 50 |
| S/N ratio (dB) | | +37.7 | +38.2 | +38.4 | +34.0 | +33.1 |

*1: Polyester resin having active hydrogen equivalent of about 2,400 and molecular weight of 5,000.
*2: Vinyl chloride-vinyl acetate copolymer having active hydrogen equivalent of about 1,200 and molecular weight of 10,000.
*3: Polyurethane resin having active hydrogen equivalent of about 700 and molecular weight of 25,000.

COMPARATIVE EXAMPLE 8

A polyester resin having an active hydrogen equivalent of 1,500 was employed in place of Vylon 200 in Example 1. As compared with Example 1, orientation percent, surface smoothness and gloss were deteriorated to a remarkable degree, and S/N ratio of a formed perpendicular orientation tape was as small as 34 dB.

As is definite from the foregoing, with regard to the magnetic recording medium of this invention, any flocculation of the hexagonal system ferrite magnetic powder does not occur, dispersion properties are excellent, perpendicular orientation ability and thus smoothness on the coating film are also good, and S/N properties are noticeably improved. Therefore, it can be concluded that the magnetic recording medium of this invention has a great industrial value.

We claim:

1. A magnetic recording medium comprising a substrate coated with a mixture which consists essentially of (1) a ferrite magnetic powder comprised of particles having (i) a hexagonal plate-like configuration and (ii) an average particle diameter of 0.2 μm or less and (2) a binder resin having an active hydrogen equivalent of 2,000 or more.

2. The magnetic recording medium according to claim 1, wherein said hexagonal system ferrite magnetic powder is a hexagonal barium ferrite magnetic powder.

3. The magnetic recording medium according to claim 1, wherein said hexagonal system ferrite magnetic powder is coated with a surface active agent which comprises an alkyl group having 4 or more carbon atoms or an aryl group substituted by an alkyl group having 4 or more carbon atoms.

4. The magnetic recording medium according to claim 3, wherein said surface active agent comprises at least one compound selected from the group consisting of compounds represented by the following formulae (I) to (V):

wherein M is a hydrogen atom, an alkali metal or an alkaline earth metal; $R^1$ is represented by the formula,

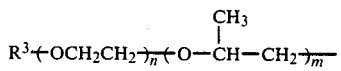

wherein $R^3$ is an alkyl group having 4 to 20 carbon atoms or an aryl group substituted by an alkyl group having 4 to 20 carbon atoms, and n and m are integers satisfying relations of $0 \leq n \leq 14$, $0 \leq m \leq 20$ and $0 \leq n+m \leq 20$; and $R^2$ is the same as $R^1$ and M,

wherein $R^3$ is an alkyl group having 4 to 20 carbon atoms or an alkyl group substituted by an alkyl group having 4 to 20 carbon atoms; and M is as defined above,

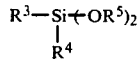

wherein $R^3$ is as defined above; R is the same as $R^2$, a methoxy group or an ethoxy group; and $R^5$ is a methyl group or an ethyl group,

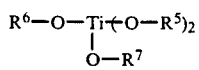

wherein $R^5$ is as defined above; $R^6$ is an alkyl group having 7 to 20 carbon atoms; and $R^7$ is the same as $R^5$ and $R^6$, and

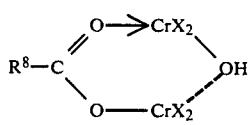

wherein $R^8$ is an alkyl group having 4 to 20 carbon atoms and X is an anion.

5. The magnetic recording medium according to claim 1, wherein the active hydrogen equivalent of said binder resin is within the range of 3,000 to 20,000.

6. The magnetic recording medium according to claim 5, wherein said binder resin comprises a polyester resin having a molecular weight of 5,000 to 30,000 and/or a polycarbonate resin having a molecular weight of 5,000 to 30,000.

7. The magnetic recording medium according to claim 1, wherein said mixture further comprises a mixing resin having an active hydrogen equivalent of 1,000 or more.

8. The magnetic recording medium according to claim 7, wherein said mixing resin is at least one selected from the group consisting of a vinyl chloride-vinyl acetate copolymer, a vinyl alcohol modified vinyl chloride-vinyl acetate copolymer, a carboxylic acid modified vinyl chloride-vinyl acetate copolymer and a polyurethane elastomer.

9. The magnetic recording medium according to claim 1, wherein said magnetic medium is a perpendicular magnetic recording medium.

10. The magnetic recording medium according to claim 1, said recording medium having a perpendicular orientation percentage value of about 82% or more when subjected to a perpendicular orientation treatment.

* * * * *